Patented Apr. 30, 1940

2,198,794

UNITED STATES PATENT OFFICE 2,198,794

PROCESS FOR RAPID SOLUTION OF VINYL RESINS

Carleton N. Smith, Rocky River, Ohio, assignor to Carbide and Carbon Chemicals Corporation, a corporation of New York No Drawing. Application November 6, 1936, Serial No. 109,497

3 Claims. (Cl. 260—32)

In the production or utilization of plastic compositions containing such materials as artificial resins, it is often necessary to dissolve, or disperse, these materials in some suitable solvent in order to facilitate handling, or in many cases to employ the material at all. In securing the desired solution or dispersion, it is customary to assist the combination of the materials by employing such aids as heat, pressure, mechanical working, and combinations of these, but even so the process of solution, or dispersion, is often very slow and laborious.

This invention is concerned with the formation of solutions, or dispersions, of such artificial resins as the vinyl resins, and the principal object of the invention is to provide an efficient process whereby solvents capable of dissolving (or dispersing) large quantities of the resins may be made to do so at any desired rate up to one of far greater rapidity than those heretofore possible.

The vinyl resins to which this invention is particularly applicable are those which are, in general, soluble in ketones, and insoluble in ethers, hydrocarbons, acids and alkalis, and water. They are soluble to some extent in certain aliphatic esters. Resins such as these may be made, for example, by the conjoint polymerization of a vinyl halide with a vinyl ester of a lower aliphatic acid are suitable, and the ones to which this invention is best adapted are those of this type in which the proportion of vinyl halide present in the polymerized product is from 70% to 95% by weight, and which have an average macromolecular weight of about 10,000, or more. (Molecular weights referred to herein are those calculated by means of Staudinger's formula from viscosity determinations on solutions of the materials.) Specifically, the conjoint polymers of vinyl chloride with vinyl acetate, propionate, or butyrate are preferred.

The object of this invention may be attained by contacting the resin with a solvent while the resin is under the action of a liquid penetrant. The penetrant may itself exert a solvent action upon the resin, or it may be a non-solvent, but it must be at least partially miscible with the solvent employed. This treatment can most readily be accomplished by mixing the penetrant with the solvent prior to contact with the resin, or if the resin is in powder form or fine granules, by merely wetting the resin with the penetrant prior to contact with the solvent.

The maximum concentration of a resin which a solvent will hold without forming a gel may be termed the ultimate dissolving power of the solvent for that resin. For a particular resin, the ultimate dissolving power of mixtures of solvents and penetrants may be greater or less than that of the pure solvent depending upon the combination of solvent and penetrant employed. Although the remarkable increase in rate of solution (or dispersion) may be enhanced in those cases where the solvent and penetrant combination provides a greater dissolving power than the pure solvent, many combinations which have a lower ultimate dissolving power than that of the pure solvent also exhibit this remarkable increase in rate of solution (or dispersion). Therefore it is believed that this increase is due largely to the greater penetrating power of the mixture. It may be that prevention of agglomeration of resin particles by the penetrant component of the mixture is a strong factor in accomplishing the rapid dispersion, but it is not the only one, for single large pieces of the resin dissolve, or disperse, much more rapidly in the solvent-penetrant mixture than in the pure solvent. However, it is to be understood that the invention is not to be limited by any theoretical explanations or discussion advanced herein.

In order to secure the most rapid acting mixture, it is necessary to limit the proportion of penetrant to solvent to such a concentration that the ultimate dissolving power of the mixture is not unduly less than that of the pure solvent. Otherwise the rapid dispersing action of the mixture will be largely counteracted by its low ultimate dissolving power.

To illustrate the remarkable effectiveness of this invention, the following examples are given. For comparative purposes in the examples, the temperature in each case was held at about 25° C., and rolling agitation was used with a constant speed of 170 R. P. M. The resin used was a conjoint polymer of vinyl chloride with vinyl acetate, containing 85% to 90% by weight of vinyl chloride, and having an average macromolecular weight of about 10,000.

EXAMPLE I

Three samples of powdered resin of 12 grams each, sized to pass through a 20 mesh screen (openings 0.86 mm.), were dissolved as follows: The first was dissolved in 100 cc. of acetone (solvent); the second was dissolved in 85 cc. acetone after being thoroughly wetted with 15 cc. of the penetrant, carbon tetrachloride (nonsolvent); and the third was dissolved in 65 cc. acetone after being wetted with 35 cc. carbon tetrachloride. Complete solution of the samples was effected in 145 minutes, 30 minutes, and 5 minutes, respectively.

EXAMPLE II

Two samples of powdered resin of 12 grams each, prepared as in Example I, were dissolved as follows: The first was dissolved in 85 cc. acetone after being treated with 15 cc. carbon bisulfide (nonsolvent); and the second was dissolved in 45 cc. acetone after treatment with 55 cc. carbon bisulfide. Complete solution of the samples was effected in 19 minutes and 1¼ minutes, respectively.

EXAMPLE III

Two samples of powdered resin of 12 grams each, prepared as in Example I, were dissolved as follows: The first was dissolved in 90 cc. acetone after being thoroughly wetted with 10 cc. isopropyl ether; and the second was dissolved in 75 cc. acetone after being thoroughly mixed with 25 cc. isopropyl ether. Complete solution of the samples was effected in 53 minutes and 9 minutes, respectively.

EXAMPLE IV

In the following tables, the resin used in each case was in the form of a rod 1/16 inch in diameter and 4 inches long, weighing 6.2 grams. As in the preceding examples, the temperature was maintained at 25° C., and rolling agitation of 170 R. P. M. was employed. In table A the resin was dissolved in a single solvent, and tables B and C apply to previously made mixtures of penetrant and solvent.

Table A (no penetrant)

| Solvent | Time required for complete solution |
|---|---|
| | Minutes |
| 100 cc. propylene oxide | 65 |
| 100 cc. methyl ethyl ketone | 125 |
| 100 cc. mesityl oxide | 182 |
| 100 cc. acetone | 240 |
| 100 cc. methyl isobutyl ketone | 542 |
| 100 cc. dipropyl ketone | 553 |
| 100 cc. dioxan | 595 |
| 100 cc. ethyl acetate | 2800 |

Table B (penetrant is a nonsolvent)

| Solvent | Penetrant | Time required for complete solution |
|---|---|---|
| | | Minutes |
| 55 cc. acetone | 45 cc. carbon bisulfide | 57 |
| 80 cc. propylene oxide | 20 cc. carbon bisulfide | 58 |
| 65 cc. methyl ethyl ketone | 35 cc. carbon bisulfide | 80 |
| 70 cc. esityl oxide | 30 cc. carbon bisulfide | 123 |
| 75 cc. acetone | 25 cc. carbon tetrachloride | 180 |
| 80 cc. methyl isobutyl ketone | 20 cc. carbon bisulfide | 185 |
| 90 cc. dioxan | 10 cc. carbon bisulfide | 490 |
| 90 cc. ethyl acetate | 10 cc. carbon bisulfide | 400 |

Table C (pure penetrant exhibits a solvent action)

| Solvent | Penetrant | Time required for complete solution |
|---|---|---|
| | | Minutes |
| 70 cc. acetone | 30 cc. toluene | 119 |
| 75 cc. acetone | 25 cc. dioxan | 120 |
| 75 cc. acetone | 25 cc. monochlorbenzene | 134 |
| 75 cc. acetone | 25 cc. dipropyl ketone | 154 |
| 80 cc. acetone | 20 cc. trichlorethylene | 158 |
| 75 cc. acetone | 25 cc. methyl isobutyl ketone | 183 |
| 95 cc. acetone | 5 cc. ethyl acetate | 218 |

It will be noted that, in the above examples, the procedure for securing rapid solution of the powdered resin was to treat the resin with the penetrant prior to contact with the solvent; whereas rapid solution of the resin rods was secured by treatment with a previously made mixture of the solvent and penetrant. However, a solution rate far greater than that of the pure solvent is obtained regardless of whether the resin is given a prior treatment with the penetrant, or is dissolved in a previously made mixture of the penetrant and solvent. In the case of the powdered resin, treatment with the penetrant prior to contact with the solvent gave more rapid solution of the resin than was obtained with a previously made mixture having the same proportions, provided the penetrant was substantially a nonsolvent for the resin. If the resin is in the form of fairly large granules or rods, or if the penetrant exerts some solvent action on the resin, it makes little difference whether the resin is treated with the penetrant prior to, or in admixture with the solvent.

Many other experiments have been carried out which have demonstrated effectively the general utility of the process of this invention. Examples of suitable mixtures of solvent and penetrant liquids which have been used in carrying out the invention according to the procedure illustrated above, and in addition to the examples given, include dipropyl ketone with carbon bisulfide, ethylene dichloride with carbon bisulfide, and mesityl oxide with acetone. In every case, the process resulted in a remarkable increase in the rate of solution or dispersion of the resin that was impossible of attainment by other known means.

Various modifications of the process will suggest themselves to those skilled in the art, and such variations are included within the scope of this invention as defined by the appended claims.

I claim:

1. Process for rapidly forming dispersions or solutions of vinyl resins substantially identical with resins resulting from the conjoint polymerization of vinyl chloride with vinyl acetate, which comprises wetting said resin with a nonsolvent liquid penetrant and thereafter agitating the wetted resin with a solvent selected from the group consisting of acetone, methyl ethyl ketone, dipropyl ketone, mesityl oxide, propylene oxide, methyl isobutyl ketone, ethyl acetate, dioxan and ethylene dichloride to effect solution of said resin at a faster rate than is obtainable by like use of any of the solvents singly, said solvent being at least partially miscible with said penetrant.

2. Process for rapidly forming dispersions or solutions of vinyl resins substantially identical with resins resulting from the conjoint polymerization of a vinyl halide with a vinyl ester of a lower aliphatic acid, which comprises wetting said resin with a nonsolvent penetrant selected from the group consisting of carbon bisulfide, carbon tetrachloride, and isopropyl ether and thereafter agitating the wetted resin with a solvent for the resin to effect solution thereof at a faster rate than is obtainable by like use of the solvent singly, said solvent being at least partialy miscible with said penetrant.

3. Process for rapidly forming dispersions or solutions of vinyl resins substantially identical with resins resulting from the conjoint polymerization of vinyl chloride with vinyl acetate, said resins containing from 70% to 95% vinyl chloride in the polymer, which comprises wetting said resins with from about 10 to about 55 parts of a nonsolvent selected from the group consisting of carbon bisulfide, carbon tetrachloride and isopropyl ether, and thereafter agitating the wetted resins with from about 90 to about 45 parts of acetone to effect solution thereof at a rate at least twice as fast as is obtainable by like use of acetone singly.

CARLETON N. SMITH.